(12) United States Patent
Paquet

(10) Patent No.: US 6,907,331 B2
(45) Date of Patent: Jun. 14, 2005

(54) VEHICLE CONTROL SYSTEM AND APPARATUS THEREFOR

(75) Inventor: Bert J. F. Paquet, Sint-Andries (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/457,672

(22) Filed: Jun. 9, 2003

(65) Prior Publication Data

US 2005/0004726 A1 Jan. 6, 2005

(51) Int. Cl.[7] .................. G06F 19/00; G01M 17/00
(52) U.S. Cl. .................. 701/36; 710/110; 710/308; 370/282
(58) Field of Search .................. 701/210, 29, 33, 701/48, 36, 50, 32; 710/29, 15, 152, 56, 110, 107, 308; 340/825.16, 459, 461, 462, 438; 370/285, 466, 282; 714/43; 341/141

(56) References Cited

U.S. PATENT DOCUMENTS

| | | | | |
|---|---|---|---|---|
| 5,957,986 A | * | 9/1999 | Coverdill | 701/35 |
| 6,188,948 B1 | * | 2/2001 | Shivler, Jr. | 701/76 |
| 6,240,478 B1 | * | 5/2001 | Brickell | 710/110 |
| 6,559,783 B1 | * | 5/2003 | Stoneking | 341/141 |
| 6,810,314 B2 | * | 10/2004 | Tashiro et al. | 701/48 |
| 2001/0041956 A1 | * | 11/2001 | Wong et al. | 701/36 |
| 2003/0048759 A1 | * | 3/2003 | Cara | 370/282 |
| 2003/0080619 A1 | * | 5/2003 | Bray et al. | 307/10.1 |
| 2003/0082962 A1 | * | 5/2003 | Kanno | 440/2 |

FOREIGN PATENT DOCUMENTS

GB 2277999 A 11/1994

* cited by examiner

Primary Examiner—Thomas G. Black
Assistant Examiner—Tuan C To
(74) Attorney, Agent, or Firm—Rebecca Henkel; Brant T. Maurer

(57) ABSTRACT

The present invention relates to a method and apparatus for a vehicle control system comprising electronic modules used for the automatic control of vehicle operation. The method for automatic storing of configuration file data of at least three electronic modules for the automatic control of vehicle operation, the electronic modules being coupled in a network. Automatically collecting a value of a parameter stored in the electronic modules, deciding which of the collected values should be maintained as being a correct value of the parameter, and sending and/or storing the correct value of the parameter to electronic modules which did not send this value for the parameter during the collection step. A corresponding device is also provided.

31 Claims, 3 Drawing Sheets

VEHICLE CONTROL SYSTEM AND APPARATUS THEREFOR

TECHNICAL FIELD OF THE INVENTION

The present invention relates to a method and apparatus for a vehicle control system comprising electronic modules used for the automatic control of vehicle operation. The system provides automatic configuration of configuration file data of the electronic modules, whereby the electronic modules are coupled in a network. This method and apparatus may be used in vehicles, more specifically in ground vehicles such as cars, busses, utility vehicles such as agricultural and earth moving machines.

BACKGROUND OF THE INVENTION

Control systems are used extensively in industry, building and home automation, for controlling machinery and processes. Initially, a centralised control system was used, e.g. in vehicles a control system comprising only one control module, i.e. one unit in which electrical signals from all over the vehicle were gathered, and in which control signals for the different parts of the vehicle were generated. This module initially was made from cabling with switches and relays, thereafter it was made from printplates with hardware circuits, and finally a microprocessor with peripheral devices.

Fieldbus or serial control systems were then introduced. Generally, there is one centralised or master control module and the remainder of the devices on the network are slave devices. Slave devices can be actuators, sensors or transducers for instance.

In the mean time, control systems have become even more complex, and the different functions are controlled by a plurality of control modules, each with its own microprocessor. These systems may be described as distributed fieldbus or control network systems. The modules communicate with each other, for example via a CAN (Controller Area Network) and associated protocol. The modules also have their own memory, e.g. memory chips, in which, next to the necessary programs, also data is stored which is specific for that vehicle. A review of the available types of control networks is given in "Distributed fieldbus and control network systems", by G. Schickhuber and O. McCarthy, Computing & Control Engineering Journal, February, 1997, pages 21 to 32.

A Controller Area Network (CAN) serial bus system was developed in the 1980's which has become very popular for control purposes in vehicles and is now standardised as ISO 11898 and ISO 11519. The original concept was to link three essential control units of a vehicle control system: engine control, automatic transmission control and the anti-skid braking control systems. It has also been used in machine and automation control, agricultural machinery, medical instrumentation, elevator controls, public transport systems, and industrial automation control components. A description of the CAN system is provided in "An overview of Controller Area Network", M. Farsi, K. Ratcliff, M Barbosa, in Computing & Control Engineering Journal, June 1999, pages 113 to 120. The original CAN concept allows peer-to-peer and broadcast or multicast communications. The physical layer is defined by ISO 11898. The data link layer is defined in CAN 2.0. Higher layers are proprietary solutions, e.g. Canopen described by M. Farsi, K. Ratcliff, M Barbosa, in "An introduction to CANopen", Computing & Control Engineering Journal, August 1999, pages 161 to 168. Vehicle control systems have become even more complex since the first three module design—a modern luxury automobile may include 10 to 15 electronic control units.

One problem identified with the original CAN was that a message did not have a guaranteed transmission time—delays could occur and were not controlled, a result of the fact that the original CAN protocol was event-triggered. Accordingly, a time-triggered modification to CAN has been proposed—see "Time-triggered controller area network", by G. Leen and D. Heffernan, in Computing & Control Engineering Journal, December 2001, pages 245 to 256.

However, even with these improvements, when one of the modules of a distributed fieldbus or control network system becomes defective, the whole module has to be replaced by another one. By doing this, the specific data is lost, and must be read in again by an installer with a (portable) computer or other similar field tool. There exists a non-negligible risk that data is read in wrong or incompletely.

SUMMARY OF THE INVENTION

It is an object of the present invention to provide controller systems and methods of operating avoid the above-mentioned risk of inputting wrong or incomplete data.

The above objective is accomplished by a method and a device for automatic storing of configuration file data of at least three electronic modules for the automatic control of vehicle operation, the electronic modules being coupled in a network.

The method comprises the steps of, at start-up of the vehicle:

collecting automatically a value of a parameter stored in the electronic modules. This collection can be done via the network or via a separate communication channel such as a cable. The collecting step may be carried out by sending messages over the network or over the separate communication channel. The collecting step may include reading from an EEPROM or from a RAM.

deciding which of the collected values should be maintained as being a correct value of the parameter. The deciding step may be based on a majority decision obtained by voting on the collected values.

sending and/or storing the correct value of the parameter to electronic modules which did not send this value for the parameter during the collection step. The sending step may comprise the sending of the correct value of the parameter to electronic modules via the network or via a separate communication channel such as a separate cable. The storing step may include writing the correct value into a RAM.

The method may furthermore comprise a step of releasing the network for engine startup after the sending step.

There may be no synchronisation between the different modules.

The configuration file data may include at least one of:
configuration data concerning the configuration of the vehicle,
calibration data which control outputs of the vehicle,
settings data concerning vehicle parameters chosen by the user.

The present invention also provides a storing device for automatic storing of configuration file data of a plurality of electronic modules for the automatic control of vehicle operation. The electronic modules comprise a memory such as for example a RAM or an EEPROM. The electronic modules and the storing device are coupled in a network. The configuration device comprises:

collecting means for automatically collecting values via the network of a parameter retrieved from the memories of the electronic modules, a decision taking means for deciding which of the collected values should be maintained as a correct value. The decision taking means may decide based on a majority decision in accordance with a voting algorithm using the collected values.

a distribution and/or storing means for sending and/or storing the correct value to electronic modules which do not have that value for said parameter. The distribution and/or storing means may include means for sending the correct value via the network or via a separate channel such as a separate cable to electronic modules which do not have that value for said parameter.

The storing device may further more comprise means for releasing or permitting the network for engine startup.

The modules may or may not be provided with synchronisation means.

The present invention furthermore provides a control network for a vehicle comprising a storing device as mentioned above. The present invention also provides a vehicle comprising such a control network, for example a land-based vehicle.

The present invention also provides a computer program product for executing any of the methods of the present invention when executed on a computing device associated with a module, and a machine readable data storage device storing such a computer program product.

According tot the present invention, the memory elements of at least 3 modules on the vehicle hold an identical copy of non-volatile memory parameters (vehicle-specific data). A system that runs on a plurality of modules, detects when a module is replaced, for example by checking whether a module contains blank fields or fields with another pre-set value, or by checking whether the data of one module correspond to the data of the other modules. When a new module is installed, one of the previously present modules copies the machine-specific data into the memory of the new module. Therefor, the new module is, by its installation itself, immediately adapted to the vehicle on which it is installed.

Furthermore, also when no modules are replaced, vehicle-specific data is checked for consistency and amended if need be.

Advantages of the present invention are as follows:

a new module connected to the network will automatically take over the parameters from the other modules;

modules will always work with the same configuration parameters;

a module that would not succeed in saving a value, will receive the right value when booting the next time;

a triple copy of memory parameters in each module can be omitted; triple copies of data were kept previously to ensure data security;

in case no match is found, this will be indicated by means of an error message presented to a user, and this way the user knows when to connect a service tool to get the error solved; and each participating module holds an identical table of what locations are votable; and if a location is not votable, it will be controlled locally by 1 module.

Other features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
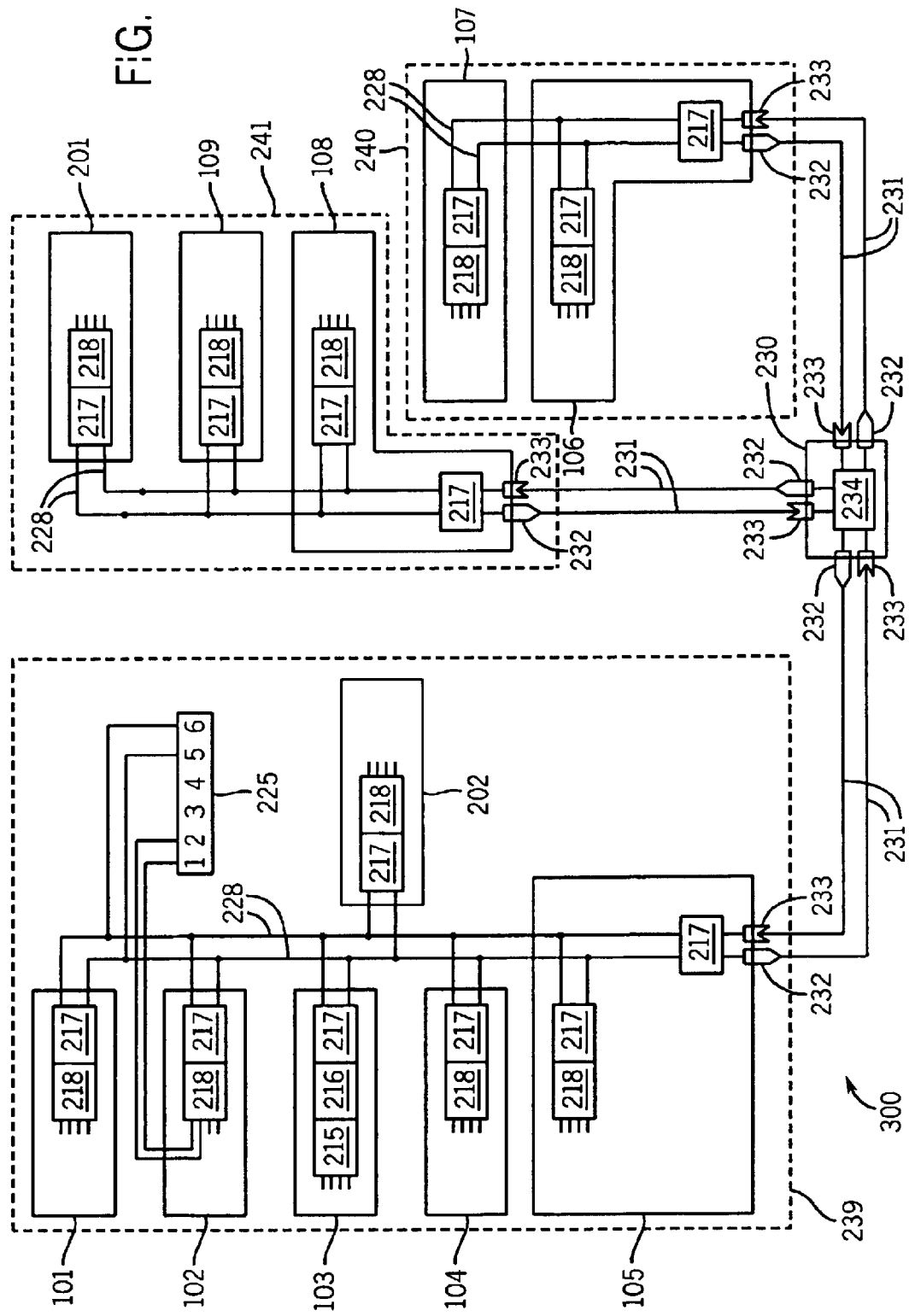
FIG. 1 shows the configuration of a communication network which can be used with the present invention.

In the different figures, the same reference figures refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Control networks which may be used with the present invention may include the CAN, e.g. as defined by ISO 11898 and ISO 11519 or modifications and derivatives thereof as well as similar networks such as DeviceNet developed by Allen Bradley, USA, Profibus, e.g. as defined by DIN 19245 T1 to T4, EN 50170 and IEC 1158-2, LonWorks and using for instance LonTalk protocol, as developed by Echelon Corps. Palo Alto, USA, ASI, HART as developed by Hart, Austin, Tex., USA, Rackbus, BITBUS as defined by IEEE 1118, IEC-Fieldbus as defined by IEC 1158-2, Inter-Bus as defined by DIN E 19258, P-NET as defined by EN 50170, SECROS, SDS, TRON, WorldFIP as defined by NF C46-602 to 07, EN 50170, IEC 1158-2.

The present invention may be used in vehicles, more specifically in land-based vehicles. One specific type of vehicle, a combine harvester, and its control system is described in detail in EP-0631906. The present invention can be applied to such or other utility vehicles, such as agricultural or earth moving machines, as well as fire engines and similar. It is, however, not intended to limit the present invention to such machines; it can also be applied to other vehicles, such as personal cars or busses for example.

In a vehicle according to the present invention, a plurality of modules are provided, enabling decentralisation of machine controls. Each module comprises a processing unit such as a microprocessor element or a programmable digital logic element such as a Programmable Gate Array, a Programmable Logic Array, Programmable Array Logic or a Field Programmable Gate Array (FPGA) for running a control algorithm or program, and a memory element for storing both program code and vehicle-specific or configuration file data for the vehicle. This configuration file data comprises:

configuration data: data about the configuration of the vehicle, e.g. type of vehicle, type of engine, installed options, calibration data: data which control the output of the vehicle, e.g. destination country, output language on displays, range of installed sensors necessary for correct interpretation of signals, settings: data concerning vehicle parameters chosen by the user, e.g. airco settings, velocity, Every module handles sensor signals from and actuator signals to a limited part of the vehicle. The plurality of modules are connected to a common bus so that data can be distributed between the different modules. The common bus may be of a hierarchical type, i.e. according to a protocol requiring a single master controller module controlling the bus (such as e.g. Actuator Sensor Interface (ASI), BITBUS or others), or it may be of a peer-to-peer type, i.e. according to a protocol not requiring a master/slave configuration (such as e.g. the Controller Area Network (CAN) protocol or others).

As an example, a vehicle is considered, in which the various settings are controlled by means of a communication network 300 which is generally depicted in FIG. 1. The network 300 as represented is a bi-directional single channel network for the serial communication of digital data between processing elements 215, 218, such as microprocessors which each are part of a controller module. These data are coded according to an advanced serial communications protocol with a very high level of security, such as the Controller Area Network (CAN) protocol, described in "CAN specification, Version 1.0", published in 1987 by Robert Bosch GmbH. According to this protocol, interference of messages is prevented by gibing to every message an initial, identifier portion, which indicates the type of the message and determines its relative priority. During the transmission of a message to the network 300 the processing elements 215, 218 keep receiving signals from said network 300, and when a higher priority message is detected, the lower priority message is truncated. This message is repeated automatically, when the higher priority message is finished. The messages are coded for detection of transmission errors. As the identifier has a length of 11 bits, a wide range of message types can be sent to the network. CAN enables effective communication between processing units in a multi-master configuration, that is to say that no single processing unit steers the whole network 300. For further details on the can protocol there is referred to the said Bosch publication as well as the articles mentioned above.

The signals from and to the other electrical network components, including command means, sensor means, machine actuator and display means, are collected or generated by electrical modules 101–109, 201–202, which comprise circuit boards and programmable processing elements 215, 218 for the automatic control of machine settings. These processing elements 215, 218 also transmit to and receive from the network 300 messages, which are coded according to the CAN-protocol. Both the controlling and communicational functions can be integrated into one single chip. A processing element 218 may comprise a microprocessor, e.g. the Motorola chip 68HC705X4, which is installed in most of the modules 101–109, 201–202.

However, the data storage and processing capacity of such chips is limited. Where the number and/or complexity of controls require a higher data processing capacity, a conventional, more powerful processing element 215, is installed and linked to a separate CAN chip 216 for communication of CAN-coded messages from and to the network 300. Such a conventional more powerful processing element 215 can include a microprocessor, e.g. the Motorola chip 68HC11, which is installed in the display module 103, for instance. Network messages are encoded and decoded by the separate Philips CAN chip PCA 82C200. Transmitter-receiver units 217, such as the Philips PCA 82C250, make the connection with a wired portion 228 of the network 300.

As every module 101–109, 201–202 is linked to the network 300 through its own processing element 215, 218 and as the network communication according to the CAN protocol is not controlled by one single (master) processor, there will be no obstruction to the data exchange between the other modules, when a processing element 215, 218 of any module breaks down partially or completely.

The network 300 as represented in FIG. 1 comprises three connection portions 228. Typically, each of these connection portions 228 comprises two electrical conductors, e.g. a screened or unscreened twisted pair, however the present invention is not limited thereto. Any suitable connection means may be used, e.g. fibre optic connections, radio frequency (wireless) especially as provided by the Bluetooth™ protocol (for further details see "Bluetooth, Connect Without Wires" by Jennifer Bray and Charles F. Sturman, published by Prentice Hall PTR), infra-red optical transmission including diffuse infra-red and coaxial cables. Each portion 228 interconnects modules which physically are located close to each other: a first portion 228 is linked to the modules 101–105 and 202, which are for example mounted in a first box 239 close to the dashboard; a second portion 228 to the modules 106 and 107 in a second box 240 for providing transmission control; and a third portion 228 to the modules 108, 109 and 201 in a third box 241 for providing engine control.

Considering the fairly long distances between the boxes 239, 240, 241, it is not recommended to interconnect these three portions 228 with electrical wires. Indeed, in case electrical conductors are used for long distance transmissions, electromagnetic interferences may generate unwanted signals in the network 300 and thus may disturb the transmission of messages. Therefore these interconnections are realized by an optical transmission network, in which the messages are formed by light pulses, which cannot be affected by radio transmission which may pass through glass or plastic optical fibres.

The modules 105, 106 and 108 each contain a second CAN-transmitter-receiver unit 217, which is linked to an optical transmitter 232, such as the SFH452V, and to an optical receiver 233, such as the SFH551V, both supplied by Siemens, Germany. The optical signals pass through plastic optical fibres 231, which permit good data transmission over distances, such as those between the cab and the boxes 240 and 241, and do not require the very strict precautions which are needed for the assembly of the more expensive and vulnerable glass optical fibre.

Each module 105, 106, 108 is linked to an optical star module 230 by two fibres 231 of which one is connected to the optical transmitter 232, and the other to the optical receiver 233 of said modules. At the star module 230 an active starpoint is formed by connecting an electrical circuit 234 to optical transmitters 232 and receivers 233. The incoming optical message from a module 105, 106, 108 is received at one of the star receivers 233 and transformed into an electrical signal, which is OR-ed with the signals from the other modules by said circuit 234. The resulting logical OR signal is transferred to all optical star transmitters 232 and fed to the optical receivers 233 of the modules 105, 106 and 108. Such optical star network enables CAN transmission between a plurality of optical nodes and guarantees a sufficient power budget at all optical nodes. Passive star points, which only divide the energy of incoming light pulses over a plurality of outgoing fibres, will need more powerful transmitters 232 at the modules 105, 106, 108 in order to obtain the same transmission quality.

The dashboard contains a socket means 225, for example in the form of a conventional RS232 socket for serial communication to the network 300 and the other processing elements 215, 218. This connection to the network 300 is used to transmit and receive single data messages, but also to reprogram the processing elements 215, 218 of the modules.

By way of example a possible repartition of command means, sensor means, machine actuator means and display means over a plurality of modules 101–109, 201 are described in EP-0631906.

According to the present invention, some or all modules connected to the same bus work with the same configuration parameters. Parameters necessary for the correct functioning of the modules are stored in the memory elements of each of the modules. In accordance with an embodiment of the present invention if one module is replaced by a new one, the new module connected to the bus will automatically take over the parameters from one or more of the other modules. This take over can be achieved in accordance with an embodiment of the present invention by running a procedure called a voting procedure. This means that one of the modules, which acts as a master module, seeks information about parameter values from other modules. It decides, based on a majority decision, what is the value the parameter should have, and then communicates this value to modules which do not have this value stored for the parameter looked at. Modules that would not succeed in saving a value at a moment in time will receive the right value when booting the next time.

Figure 2:
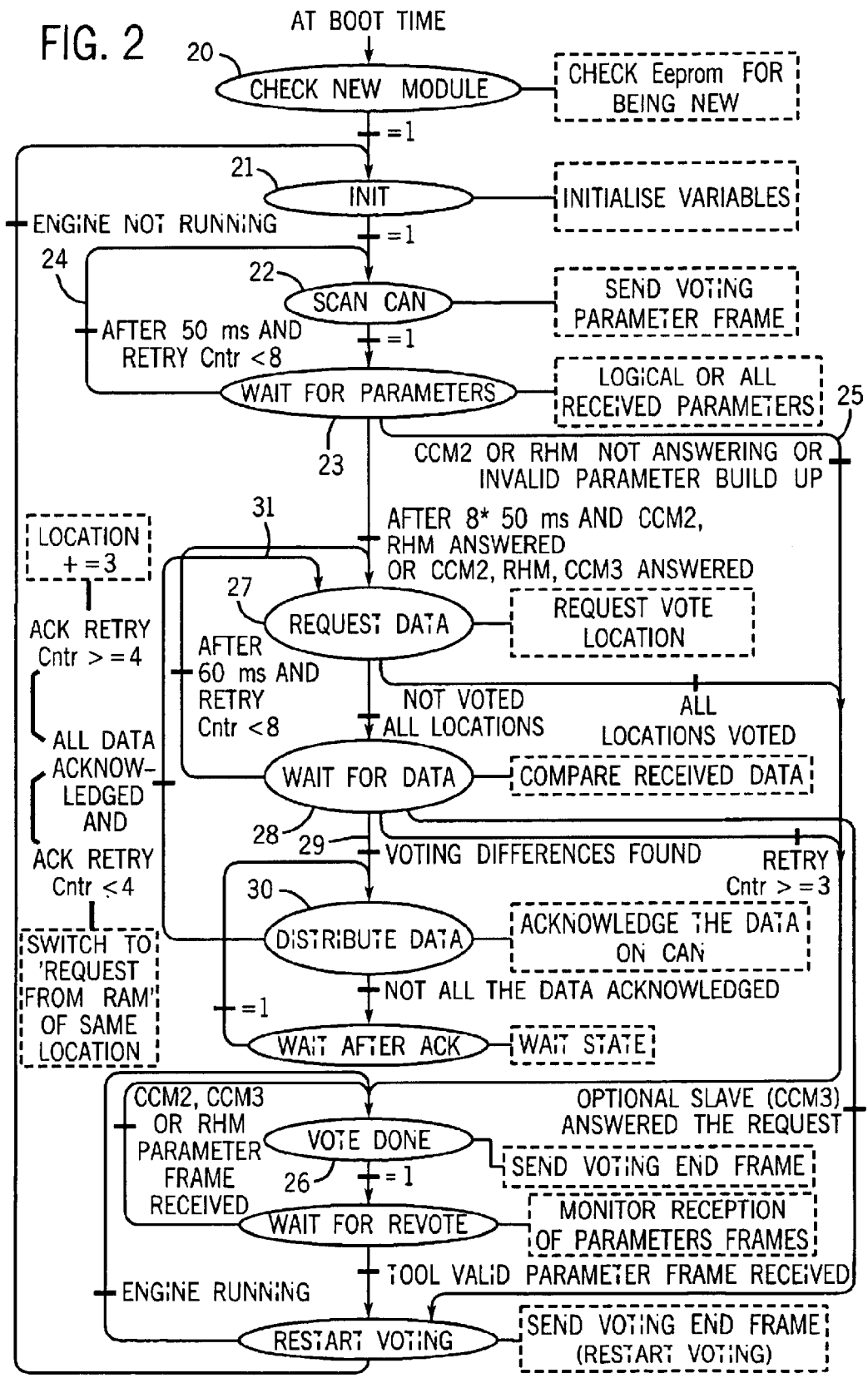
FIG. 2 is a flow state diagram of the method of the present invention.

This procedure is explained hereinafter. FIG. 2 shows a state diagram of the procedure.

In case of a network made according to the CAN protocol as explained above, information on the bus is sent in fixed format messages of different but limited length. For example the following CAN data frame can be used to communicate voting frames:
ID: byte 1+byte 2
Data #1: byte 3+byte 4
Data #2: byte 5+byte 6
Data #3: byte 7+byte 8
Depending on the value of ID, the content (Data #1–Data #3) of a message sent on the bus has a different meaning. The ID may for example mean "Voting EEPROM data request", "Voting EEPROM data response", "Voting RAM data request", "Voting RAM data response", "Voting info", "Voting parameters", or "no function".

A plurality of modules (at least three) may be present on the network. In principle, all those modules can be equal (peer-to-peer communication, no master/slave configuration) or one can be defined as a master unit. For example, all modules may be programmed to let control module CCM1 initiate the voting procedure, i.e. it should be a decision module. However, if module CCM1 does not initiate this procedure, then CCM2 can take over and so on until a valid decision module is obtained. Thus, each module can assume a master or slave role or all may co-operate generally in a peer-to-peer manner with one module designated as a decision module as far as configuration data is concerned.

Figure 3:
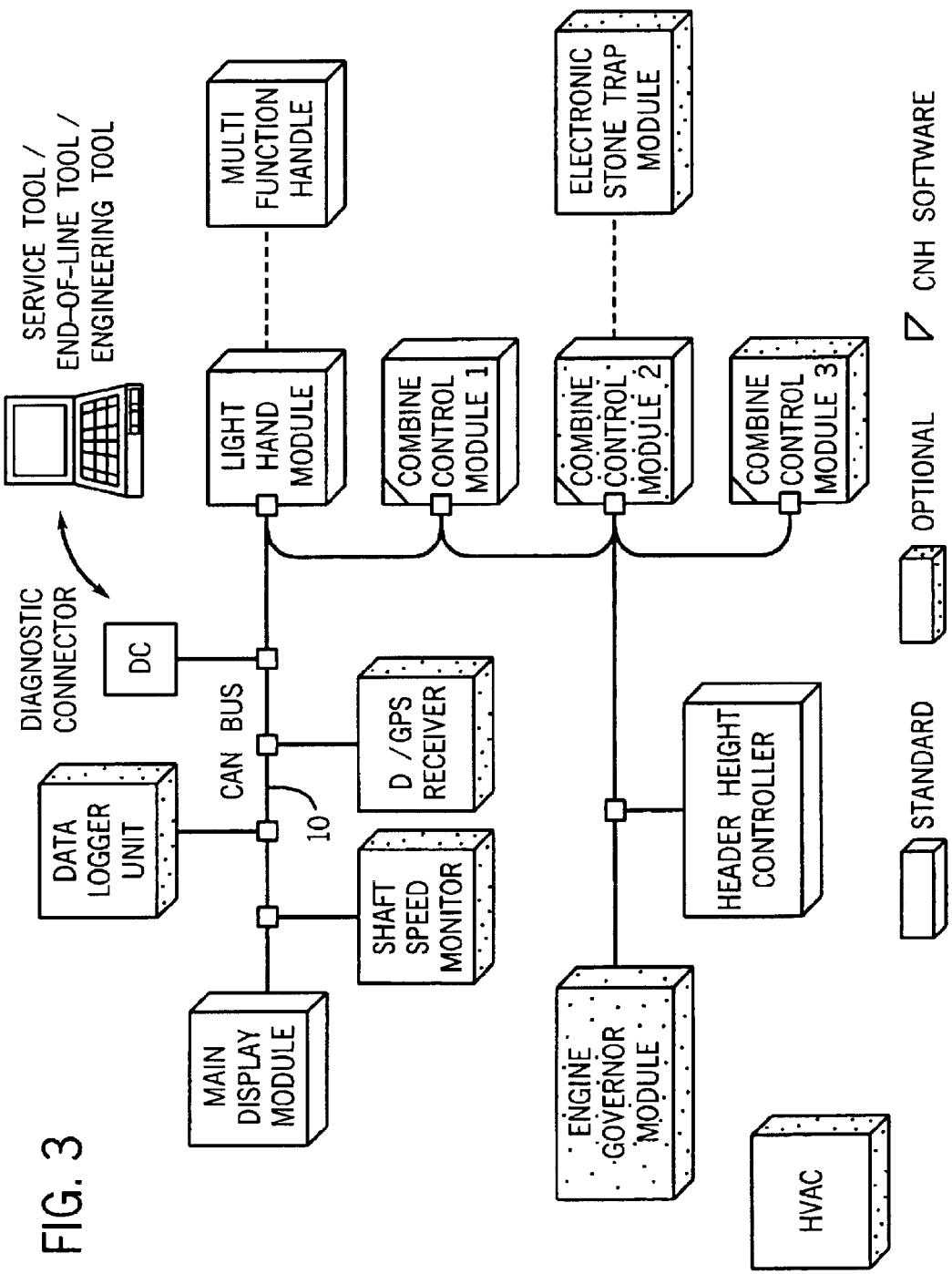
FIG. 3 is a block diagram illustrating a highly simplified form of the electronic block which may be present in a device according to the present invention.

A block diagram of the electronics of a combine harvester is shown in FIG. 3 as an example of an embodiment of the present invention. A CAN bus 10 connects different elements to each other: a first control module CCM1, a second control module CCM2, a right hand module RHM, a main display module MDM for displaying data to an operator, a header height controller HHC for controlling the height of the header, and a diagnostic connector DC for making a connection with a service tool. An electronic service tool, such as a PC for example, may be used for inputting data. As this might generate errors (typing errors), such electronic service tool should only be used when a plurality of modules are defective, so that no decision can be made on what should be the correct value to be distributed over the plurality of modules. Instead of a PC, for example a back-up module can be used.

Optionally, actuator, monitoring and/or sensor modules may be included on the network, for example a data logger unit, a shaft speed monitor, a GPS receiver, a third combine control module CCM3 and an engine governor module can be connected to the CAN bus.

Voting is triggered at boot time, i.e. when an engine start procedure is initiated such as a key is turned to a first position, but before the engine is actually started. It is conventional in vehicles that a start switch has two positions, a first one in which electrical power and electronic systems are activated and a second one in which power is supplied to a starter motor. Voting is done before any application is started. This way, the CAN bus can be used (temporarily) to only send voting frames.

Voting will only start if at least three pre-set required modules (e.g. CCM1, CCM2 and RHM) are present on the CAN network 10. If one of these pre-set modules is not present, the master module CCM1 will indicate this by sending a voting end frame indicating that there are not enough modules present.

After key-on and running the bootcode, the following steps are performed (FIG. 2).

In a first step, each module checks (20) whether it is a new module which is present in the network, by checking the status of a flag, e.g. whether a certain value is present at a certain location in the EEPROM. There are different possibilities: either the module is brand new, and in that case the EEPROM will have a certain pre-set value. This module sends a voting parameter frame indicating that it does not have correct EEPROM data. If the pre-set value is not found, the module is not new, but may be an already used module. A service tool such as a PC for example can be connected to the diagnostic connector, and send a voting parameter frame indicating that the module does not have correct EEPROM data.

In a second step, each module calls initialising functions (21) for initialising voting variables and for clearing voting buffers.

In a third step, a scan procedure is started (22) by the master or decision module. The master or decision module sends out a Voting parameter frame with the current voting parameter, in order to initialise the voting process. By sending this Voting parameter frame, the master or decision module requests the parameter frame from the slave modules or peer modules. The master or decision module then waits (23) for parameters. The message is sent every 50 ms (24). It stops after 400 ms, or if all slave or peer modules have answered the request. Slave or peer modules also answer with a Voting parameter frame. A slave or peer module can report its data as invalid, and as a result, this data will not be considered by the master or decision module for future voting. The parameter will be made up of logical OR-ing all received parameter frames.

After this, the master or decision module makes up a table for all modules, depending on their response to the request, to indicate how a module should be considered during voting. A module can be considered as:
being not present,
doing normal voting,
having invalid data, or
delivering copy data.

Possible situations after the Scan step are:

- Any of the pre-set required modules (CCM1, CCM2 or RHM) is not present (25). In this case the master module sends out a Voting End frame (26) indicating a parameter conflict.
- Invalid voting procedure: if there is more than 1 copy command or if all modules contain invalid data. In this case the master module will send out a Voting End frame indicating a parameter conflict.
- In all other cases the master module will start voting (27).

The master module starts voting of each of the modules (27). The master or decision module can send out a Voting EEPROM data request, by which the master or decision module requests the content of a voting parameter of a slave or peer module at a certain voting location in the EEPROM, or a Voting RAM data request, wherein the master or decision module requests the content of a voting parameter of a slave or peer module at a certain voting location in the RAM. Data #1–Data #3 sent out by the master or decision modules in a message with these IDs has no functional meaning, but can however be used by a CAN tool to monitor the voting process. A master or decision module initially requests EEPROM words and waits for data (28) to be received from the slave or peer modules. If differences are to be resolved, a RAM copy of the content of the EEPROM is written. After this, the RAM copy is voted. This way voting can always be retriggered without influences as long as the ignition key has been left on in the first position. At key off, all EEPROM contents are overwritten by the RAM copy.

Each slave or peer module responds to all requests received from the master or decision module, normally with a Voting EEPROM data response or with a Voting RAM data response, possibly with a Voting parameter frame. The voting parameter is made up of logical OR-ing all voting parameters received from all modules.

Possible situations are as follows:

- Reception of a Voting EEPROM data response or of a Voting RAM data response of an offline module (a module considered not to be present). The master or decision module aborts the voting process and sends a Voting End frame, indicating voting has been aborted. The master or decision module restarts voting. When voting is restarted, the voting parameter (which is an indication of which modules contain valid or copy data) is reset to 0.
- Reception of a Voting Parameter frame. No reaction of the master or decision module, it continues voting.
- Reception of Voting EEPROM data response or of Voting RAM data response, with voting differences (majority data found) (29). The master or decision module sends a message with the majority data to the slave or peer module (30) which has to store this data. Afterwards, the master or decision module revotes this location (31), with voting ID Voting RAM Data Request. This can be repeated a certain number of time, e.g. max 3 times, after this the master or decision module will continue with the next voting location. The master or decision module will only allow a slave or peer module to set its own bits, so a slave or peer cannot influence another slave's or peer's behaviour. However, a master or decision module will allow a tool to set all bits, so a tool can influence all modules participating in the voting.
- Reception of Voting EEPROM data response or of Voting RAM data response, with voting conflicts (no majority data found). The master or decision module will continue with the next voting location.
- CCM1 or CCM2 or RHM becomes off-line. The master or decision module waits a default time, e.g. 10 ms, and then resends the Voting EEPROM data request or the Voting RAM data request. The master or decision module will retry a certain number of time, e.g. max 3 times, and after this the master or decision module sends out a Voting end frame indicating conflicts are remaining. An error will be saved in the error history (during application time).

The master or decision module can also send out Voting info to give some information on the voting process, such as:

- "all OK": sent when voting ended without conflicts nor differences,
- "differences solved": sent when voting ended with differences found and solved,
- "conflicts remaining": sent when voting ended with unsolved conflicts,
- "voting restarted": sent as a response to a Voting parameter frame from a tool, to indicate that voting will restart,
- "parameter conflict": sent after the scan phase, to indicate that either multiple copy commands have been received, or that all modules have invalid data,
- "index conflict": sent as a response to a Voting parameter frame from the tool, to indicate that the passed start-stop index contains faulty information,
- "not enough modules present": sent after the scan phase, to indicate that one of the pre-set required modules is not answering to the parameter request from the master or decision module, or
- "engine running": sent as a response to a Voting parameter frame from the tool, to indicate that voting could not be restarted due to a running engine.

A tool can at any time send out a Voting parameter frame to report that data of a module is invalid, to report that data of any module should be used as source copy data or to request that (a) particular location(s) be voted.

At boot time, the slave or peer modules transition to "Application running" after a default time, e.g. after 5s, or if a Voting End frame has been received from the master or decision module.

The voting process can be changed by sending a Voting parameter frame. The voting process can be changed if a module detects its data as being invalid, if a service tool forces the voting to take data from 1 module (copy command) or if a service tool declares a module's data invalid. A service tool may be a PC or a backup module from which data is downloaded. A tool can change the behaviour of one or more participating modules. A tool can also request a particular area to be voted. If a tool requests a vote restart, the voting parameter is initialised with the parameter received from the tool.

As a first example, a vehicle is considered in which 3 electronic modules are present. The three electronic modules are connected in a network. The network can be an event triggered or a time triggered serial bus network. The following decision algorithm may be implemented:

If 1 module is replaced, and the other modules have the same data, then the voting procedure will copy the good data to the changed module (voting difference). If 1 module is replaced, and the other modules have different data, then there is a voting conflict which generates an error that needs to be solved by a service tool.

If 2 modules are replaced, and they are both brand new modules, the master or decision module will know that these modules have invalid data, so it will vote using a copy command from the good module. No voting conflict can occur in this case. If the 2 modules are replaced by one brand new module and one used module, the master or decision module will know that the brand new module has invalid data, but the service tool must indicate that this used module contains invalid data. The master or decision module will vote using a copy command from the good module. If the 2 modules are replaced by 2 used modules, the service tool must indicate that these 2 modules contain invalid data, and the master or decision module will vote using the copy command.

As a second example, a vehicle is considered in which 4 electronic modules are present. The 4 electronic modules are connected in a network. The network can be an event triggered or a time triggered serial bus network. The following decision algorithm may be implemented:

If 1 module is replaced by a brand new one and at least two of the other modules have the same data, the voting procedure will copy the good data to the replaced module. If 1 module is replaced and the 3 other modules have different data, there is a voting conflict. This voting conflict generates an error that needs to be solved by a service tool.

If 2 modules are replaced by brand new ones, the master or decision module will know these modules have invalid data, so it will vote with the 2 other modules. In case there are no conflicts, the good data is copied into the two brand new modules. In case of conflicts, an error is generated which has to be solved by a service tool. If the 2 modules are replaced by 1 brand new module and 1 used module, the service tool must indicate that the used module contains invalid data. The master or decision module will then vote with the two remaining modules. In case of conflicts, the service tool has to solve it. If the 2 modules are replaced by 2 used modules, the service tool must indicate that these 2 modules contain invalid data. The master or decision module will then vote with the two remaining modules. In case of conflicts, the service tool has to solve it.

If 3 modules are replaced by brand new ones, the master or decision module will know these modules have invalid data, so it will vote using a copy command from the good module. No voting conflict can occur. If the 3 modules are replaced by 1 or 2 brand new ones, and 2 or 1 used module respectively, the service tool must indicate that the used module(s) contain(s) invalid data. The master or decision module will know that the new module(s) has (have) invalid data, and it will vote using a copy command from the good module. If 3 modules are replaced by 3 used modules, the service tool must indicate that these 3 modules contain invalid data. The master or decision module will vote using the copy command from the good module. No voting conflict can occur.

If a completely new machine rolls out of production, none of the modules contains machine-specific data. The data is then uploaded with a tool, such as a PC for example, to all the modules.

While the invention has been shown and described with reference to preferred embodiments, it will be understood by those skilled in the art that various changes or modifications in form and detail may be made without departing from the scope and spirit of this invention.

What is claim is:

1. A method for automatic storing of configuration file data of at least three electronic modules for the automatic control of vehicle operation, the electronic modules being coupled in a network, the method comprising the steps of, at start-up of the vehicle:
   collecting automatically via the network a value of a parameter stored in the electronic modules;
   deciding which of the collected values should be maintained as being a correct value of the parameter; and
   sending and/or storing, the correct value of the parameter to electronic modules which did not send this value for the parameter during the collection step.

2. A method according to claim 1, wherein the deciding step is based on a majority decision obtained by voting on the collected values.

3. A method according to claim 1, furthermore comprising a step of releasing the network for engine startup after the sending step.

4. A method according to claim 1, wherein the collecting step is carried out by sending messages over the network.

5. A method according to claim 1, wherein the collecting step includes reading from an EEPROM.

6. A method according to claim 1, wherein the collecting step includes reading from a RAM.

7. A method according to claim 2, wherein the collecting step includes reading from a RAM.

8. A method according to claim 1, wherein the collecting step includes reading from a RAM.

9. A method according to claim 4, wherein the collecting step includes reading from a RAM.

10. A method according to claim 5, wherein the collecting step includes reading from a RAM.

11. A method according to claim 1, wherein the storing step includes writing the correct value into a RAM.

12. A method according to claim 2, wherein the storing step includes writing the correct value into a RAM.

13. A method according to claim 1, wherein the storing step includes writing the correct value into a RAM.

14. A method according to claim 4, wherein the storing step includes writing the correct value into a RAM.

15. A method according to claim 5, wherein the storing step includes writing the correct value into a RAM.

16. A method according to claim 10, wherein the storing step includes writing the correct value into a RAM.

17. A method according to claim 1, wherein the configuration file data includes at least one of:
   configuration data concerning the configuration of the vehicle,
   calibration data which control outputs of the vehicle, and
   settings data concerning vehicle parameters chosen by the user.

18. A method according to claims 1, wherein the sending step comprises the sending of the correct value of the parameter to electronic modules via the network.

19. A storing device for automatic storing of configuration file data of a plurality of electronic modules for the automatic control of vehicle operation, the electronic modules each comprising a memory, the electronic modules and the storing device being coupled in a network, the storing device comprising:
   collecting means for automatically collecting values via the network of a parameter retrieved from the memories of the electronic modules;
   a decision taking means for deciding which of the collected values should be maintained as a correct values; and
   a distribution and/or storing means for sending and/or storing the correct value to electronic modules which do not have that value for said parameter.

20. A device according to claim 19, wherein the decision taking means decides based on a majority decision in accordance with a voting algorithm using the collected values.

21. A device according to claim 19, furthermore comprising means for releasing the network for engine startup.

22. A device according to claim 20, furthermore comprising means for releasing the network for engine startup.

23. A device according to claim 19, wherein the memory is an EEPROM.

24. A device according to claim 19, wherein the memory is a RAM.

25. A device according to claim 23, wherein the memory is a RAM.

26. A device according to claim 19, wherein the distribution and/or storing means include means for sending the correct value via the network to electronic modules which do not have that value for said parameter.

27. A method for automatically storing configuration file data for each of at least three electronic modules interconnected via a network for controlling operation of a vehicle, the electronic modules each including a memory, the method comprising the steps of:

communicating a request for an unknown value for a parameter from one or more of the at least three electronic modules to the remaining at least three electronic modules;

identifying a decision module from among the at least three electronic modules;

collecting a response for a value of the parameter at the decision module from each of the at least three electronic modules of the network; and identifying what a correct value of the parameter should be from the collected responses for the values of the parameter from each of the at least three electronic modules.

28. The method as recited in claim 27, further including the step of:

communicating the correct value for the parameter to each of the at three electronic modules of the network; and storing the correct value for the parameter in the memory of each of the at three electronic modules.

29. The method as recited in claim 27, wherein the step of identifying the correct value for the parameter includes indicating a voting consideration for each of the at least three electronic modules of the network based on the collected responses, the voting consideration including not present, invalid data, and a source copy data; and calculating the correct value based on a majority decision of the voting considerations indicated for each of the at least three electronic modules.

30. The method as recited in claim 27, wherein one of the at least three electronic modules is replaced with a used electronic module having a previously stored value for the parameter, and further including the step of:

indicating a consideration for the response from the used electronic module to be an invalid data.

31. A control network for a vehicle, comprising:

at least three electronic modules for the automatic control of vehicle operation, the electronic modules each comprising a memory for storing a parameter for operation of the vehicle; and a bus interconnecting the at least three electronic modules, wherein each of the three electronic modules is configured to identify itself as a new module, communicate a request for an unknown value for a parameter to the other of the at least three electronic modules, and wherein one of the at least three electronic modules is configured to act as a decision module that communicates a request for a value of the parameter from each of the at least three electronic modules, collects responses for a value for the parameter from the at least three electronic modules, and determines a correct value for the parameter from the responses based on a majority decision of the collected responses from the at least three electronic modules.

* * * * *